United States Patent [19]

Morris

[11] Patent Number: 5,240,025
[45] Date of Patent: Aug. 31, 1993

[54] SEISMIC ACTIVATED GAS VALVE WITH PRESSURE INDICATORS

[75] Inventor: Stephen P. Morris, Orange, Calif.
[73] Assignee: Royston B. Williams, Orange, Calif.
[21] Appl. No.: 922,047
[22] Filed: Jul. 28, 1992
[51] Int. Cl.[5] ............................................. F16K 17/36
[52] U.S. Cl. .................................... 137/38; 137/552; 137/557
[58] Field of Search .......................... 137/38, 552, 557

[56] References Cited

U.S. PATENT DOCUMENTS

| 1,957,972 | 5/1934 | Mills | 137/552 X |
| 4,640,303 | 2/1987 | Greenberg | 137/38 |
| 5,029,601 | 7/1991 | Reschke | 137/38 |

Primary Examiner—Robert G. Nilson
Attorney, Agent, or Firm—Roy A. Ekstrand

[57] ABSTRACT

A seismic activated gas valve includes a valve body defining a vertically oriented interior chamber having a input port formed in the upper portion thereof and an output port formed in the lower portion thereof. A magnetical ball retainer is supported in the uppermost portion of the valve body and supports a steel closure ball by magnetic attraction under normal conditions. An annular steel washer and a spaced apart magnetic washer captivate a sealing O-ring to form a valve seat between the input port and output ports of the valve body. Under conditions of substantial seismic activity, the steel closure ball is separated from the magnetic ball retainer and falls downwardly through the vertical chamber and comes to rest against the valve seat in a sealing attachment. The magnetic washer beneath the sealing O-ring attracts the steel ball and resists subsequent reopening of the valve due to vibrations imparted to the closure ball. A slidable push rod is supported beneath the vertical chamber and may be extended upwardly into the chamber to lift the closure ball back up to the magnetic retainer to return the valve to its open condition. A plurality of pressure indicators are supported on each side of the valve seat and provide a visual indication of internal gas pressure within the valve body portions to permit the user to visually determine the pressure conditions and closure or open condition of the valve itself.

9 Claims, 1 Drawing Sheet

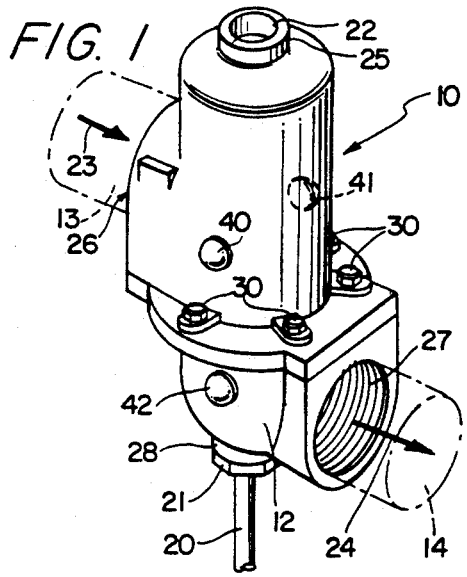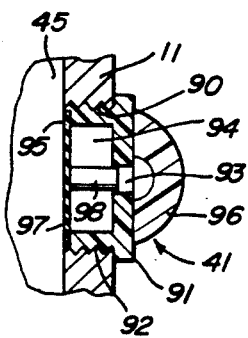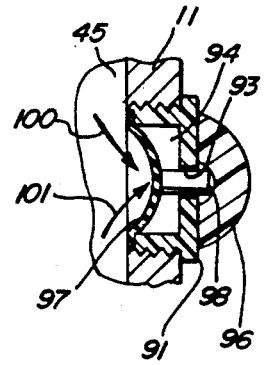

SEISMIC ACTIVATED GAS VALVE WITH PRESSURE INDICATORS

FIELD OF THE INVENTION

This invention relates generally to seismic activity protection devices and particularly to those operative to provide gas valve closure in the event of seismic activity.

BACKGROUND OF THE INVENTION

One of the greatest concerns which arises during significant seismic activity or "earthquakes" is that which occurs as the result of natural gas system leakage within homes or other buildings and facilities. In a typical scenario, the violent shaking and structure damage which may occur during a substantial earthquake or its associated preshocks or aftershocks may sever one or more gas lines within the building which in turn opens a discharge leakage through which the pressurized gas freely flows to eventually fill a portion of the building. The escaped gas is, of course, flammable and subject to extremely dangerous explosion once ignited.

Recognizing this extreme danger, safety instructions to individuals in the event of seismic activity routinely includes instructions to endeavor following any quake to detect the odor of natural gas within the building and, if so detected, evacuate the building and close the main gas supply to the building. These instructions are fine for dwellings actively monitored. However, in many instances, escaped gas goes undetected because earthquakes have occurred at times when such dwellings are unoccupied. In addition, persons injured by the building damage or quake itself as well as physically impaired people having handicapped conditions or the like are simply unlikely to be able to conduct an adequate inspection and perform the main supply gas shut-off.

To meet the need for more reliable gas shutoff during dangerous earthquakes, practitioners in the art have provided a variety of gas shutoff valves which are automatic in their shutoff operation once seismic activity above a predetermined magnitude is detected. For example, U.S. Pat. No. 3,783,887 issued to Shoji sets forth a SELF-CLOSING VALVE DEVICE IN A PIPING SYSTEM OF FLUIDS in which a vertically oriented chamber includes an inlet coupling and an outlet coupling. A valve seat is formed at the lower portion of the vertical chamber near the outlet coupling of the gas valve. A magnet in the upper portion of the gas valve chamber magnetically supports an otherwise freely movable steel ball having a size selected to provide closure and obstruction of the valve seat in the event a seismic activity shakes the steel ball loose from its magnetic support. Thus, in the event of seismic activity exceeding a predetermined magnitude, the steel ball is shaken loose from its magnetic support and falls downwardly within the vertical chamber to block the valve seat and provide gas valve closure.

U.S. Pat. No. 4,640,303 issued to Greenberg sets forth a SEISMIC ACTIVATED VALVE having a sphere of magnetic material held above a valve seat by a magnet located at the apex of a dome. The inertia of the sphere causes it to roll along the curvature of the dome to move it vertically away from the magnet and out of axial alignment with it when the valve experiences a horizontal thrust. The structure is intended to avoid response to vertical thrusts and the character of gas flow within the valve.

U.S. Pat. No. 3,521,652 issued to Reeks sets forth an INERTIAOPERATED VALVE having a casting defining a frusto-conical seating a magnet positioned adjacent the apex of the seating and a ball of magnetic material adapted to be held in the frusto-conical seating by the magnet until dislodged by a force of predetermined magnitude. Once dislodged, the ball moves a valve member axially to control fluid flow. U.S. Pat. 4,715,394 issued to O'Donnell, et al. sets forth a GAS SUPPLY SAFETY VALVE FOR EARTHQUAKE PROTECTION sensitive to earthquake accelerations on the X, Y and Z axes. A horizontal chamber includes an inlet port and outlet port disposed on opposite ends of the bottom surface thereof. A ball is restrained by an arcuate groove within the chamber and inbetween the inlet and outlet ports of the valve. During seismic activity, the ball is disturbed from its supporting groove and rolls downwardly across an inclined surface to be seated at the outlet port of the gas valve providing a shutoff action. A movable plunger is secured in alignment with the chamber to provide reset by repositioning the ball in its arcuate groove.

U.S. Pat. No. 4,485,832 issued to Plemmons, et al. sets forth an AUTOMATIC GAS SHUTOFF VALVE having a valve housing defining an inlet conduit, an outlet conduit and a central chamber communicating therebetween. A channel is provided around the interior of the valve above the central chamber. A ball normally rests in the channel and is disturbed therefrom during seismic activity and falls through the chamber to a valve seat blocking the outlet conduit for the valve. A movable plunger is supported beneath the valve seat and is used to restore the ball to its raised condition and open the valve.

U.S. Pat. No. 4,116,209 issued to Greer sets forth a SHOCK ACTUATED SHUTOFF VALVE having a valve housing defining a central chamber in communication with an inlet conduit and an outlet conduit. The housing further includes an enclosed stowage arm located within the central chamber. A valve element is disposed upon the stowage arm and is releasibly supported thereby. Vibratory force affects the displacement of the valve element from the support member permitting it to fall downwardly within the valve housing and block the gas flow through the valve.

U.S. Pat. No. 4,817,657 issued to Kovacs sets forth an INERTIALLY ACTIVATED SHUTOFF VALVE responsive to a jarring force such as an earthquake. The valve includes a valve body defining a tapered chamber in communication with an inlet portion and an outlet port. A taper weighted member is supported at the upper portion of the chamber and is released during jarring forces to fall downwardly within the tapered chamber and provide closure of the inlet and outlet ports thereof. A movable rod is provided to restore the closure element to its raised or open valve condition.

While the foregoing described prior art devices have provided some measure of increase safety for natural gas systems and the like during seismic activity, there remains nonetheless a continuing need in the art for evermore useful and improved gas shutoff valves which reliably function in response to seismic activity.

SUMMARY OF THE INVENTION

Accordingly, it is a general object of the present invention to provide an improved seismic activated gas valve. It is a more particular object of the present invention to provide an improved seismic activated gas valve which reliably demonstrates the shutoff condition and valve closure to an observer.

In accordance with the present invention, there is provided a gas valve comprises: a valve body defining an interior chamber, an input port, and an output port; a valve seat interposed between the input and output ports within the interior chamber; a magnetic retainer supported by the valve body above the valve seat; a closure element magnetically supportable by the magnetic retainer within the interior chamber at a point generally above the valve seat; a first pressure indicator coupled to the interior chamber above the valve seat and a second pressure indicator coupled to the interior chamber below the valve seat; and means for reopening the valve.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 sets forth a perspective of a gas valve constructed in accordance with the present invention;

FIG. 2 sets forth a side view of a gas valve constructed in accordance with the present invention;

FIG. 3 sets forth a section view of the present invention gas valve taken along section lines 3—3 in FIG. 2; and FIGS. 4a and 4b set forth section views of the pressure indicator portion of the present invention gas valve taken along section lines 4—4 in FIG. 3.

DESCRIPTION OF THE PREFERRED EMBODIMENT

FIG. 1 sets forth a perspective of a gas valve constructed in accordance with the present invention and generally referenced by numeral 10. Gas valve 10 includes an upper body 11 defining an input port 26 (better seen in FIG. 2) and an upwardly extending generally cylindrical boss 25. Boss 25 receives and supports a magnetic ball retainer 22. Inlet port 26 is configured to receive and coupled to an input gas line 13 shown in dashed line representation. Gas valve 10 further includes a lower body 12 which in turns defines a downwardly extending generally cylindrical boss 28 and a threaded output port 27. Output port 27 is threaded to receive and coupled to an output gas line 14 shown in dashed line representation. As is set forth below in greater detail, boss 28 is threaded a glan nut 21 which in turn receives and supports a generally cylindrical push rod 20. A plurality of threaded fasteners 30 secure upper body 11 to lower body 12 in a gas-tight seal in the manner set forth below in greater detail.

In accordance with an important aspect of the present invention, gas valve 10 further includes a plurality of pressure indicators 40, 41, 42 and 43 (the latter seen in FIG. 2). Also, in accordance with an important aspect of the present invention, pressure indicators 40 and 41 are supported by upper body 11 while pressure indicators 42 and 43 are supported by lower body 12.

During normal operation, gas valve 10 is open permitting an input flow of pressurized gas in the direction indicated by arrow 23 via input line 13 through input 26, upper body 11 and lower body 12. The pressurized gas flow continues through lower body 12 and outwardly through output port 27 and output line 14 in the direction indicated by arrow 24.

The operation of pressure indicators 40 through 43 is set forth below in greater detail. However, suffice it to note here that pressure indicators 40 through 43 are operatively coupled to the interior pressurized chamber of upper body 11 and lower body 12 within gas valve 10. Accordingly, in response to the existence of gas pressure under normal conditions within gas valve 10, pressure indicators 40 through 43 all respond and are configured in accordance with FIG. 4b set forth and described below. Thus, under normal conditions, the observer may examine pressure indicators 40 and 42, for example, and determine since both are pressurized, gas valve 10 is opened and a normal gas condition exists in which gas pressure is present. Alternatively, the user may examine pressure indicators 41 and 43 and make a similar determination. It has been found useful to provide a set of pressure indicators on both sides of upper body 11 and lower body 12 to enable the user to readily observe the pressure conditions within gas valve 10 from either side and in a variety of gas valve installations.

The operation of gas valve 10 in response to severe jarring and vibrations such as those occurring during a seismic event is set forth and described below in greater detail. However, suffice it to note here that gas valve 10 responds to such events by closing the gas flow path between upper body 11 and lower body 12. In such event, the closure of gas valve 10 is indicated by the existence of pressure indication by indicators 40 and 41 and the absence of pressure indication by pressure indicators 42 and 43. Thus, once again, the user is able by examining a single pair of pressure indicators to determine the pressure conditions within input line 13, gas valve 10 and output line 14.

In the event gas valve 10 has been closed due to severe jarring such as during a seismic event, it will remain closed in accordance with the operation set forth below until restored. Push rod 20 is movable within glan nut 21 and boss 28 in the vertical direction to restore gas valve 10 to its operational condition and facilitate the free flow of pressurized gas through valve 10. This operation is set forth below in greater detail. However, suffice it to note here that under normal conditions a steel ball is supported within the upper portion of upper body 11 due to the attraction of magnetic ball retainer 22. During seismic event and severe jarring, the steel ball is dislodged from retainer 22 and falls into a valve seat within lower body 12 causing valve closure. The restoring function of push rod 20 operates as the user forces push rod 20 upwardly through lower body 12 dislodging the steel ball and returning it to the raised position within the top portion of upper body 11 and securing it by magnetic attachment to magnetic ball retainer 22.

Once the closure ball has been returned by push rod 20 to the upper portion of upper body 11, push rod 20 is withdrawn to its lowermost position (seen in FIG. 3) at which time normal gas flow is restored through gas valve 10 and pressure indicators 40 through 43 provide positive indication of normal gas pressure.

Thus, in accordance with an important aspect of the present invention, the user is able to determine quickly by observing pressure indicators 40 and 42 or pressure indicators 41 and 43 the precise condition of gas valve 10 and the input and output lines coupled thereto. For example, if observing pressure indicators 40 and 42, the existence of pressure indication in both pressure indicator 40 and 42 indicates a normal open valve condition and a pressurized normal gas supply. In the event that indicator 40 shows gas pressure while indicator 42 shows an absence of gas pressure, the user may determine quickly that gas valve 10 has closed. Finally, in the event neither pressure indicators 40 or 42 show a pressure indication, the user is able is determine that some obstruction or other interruption of input supply at input line 13 has occurred and that gas pressure is absent from the main supply.

FIG. 2 sets forth a side view of gas valve 10. As described above, gas valve 10 includes a generally cylindrical upper body 11 having a cylindrical upwardly extending boss 24. Boss 24 receives and supports a magnetic ball retainer 22. Upper body 11 further includes a threaded input port 26 in communication with an interior chamber 45 formed within upper body 11 and lower body 12. Gas valve 10 includes a pair of pressure indicators 40 and 41 secured to upper body 11 in communication with interior chamber 45.

Gas valve 10 further includes a lower body 12 having a downwardly extending cylindrical boss 28 which receives and supports a glan nut 21. As is better seen in FIG. 3, a push rod 20 is received within glan nut 21 and boss 28 and is operative in the manner described below to restore the open condition of gas valve 10 following closure. A plurality of fasteners 30 secure upper body 11 to lower body 12 in a gas tight attachment in accordance with conventional fabrication techniques. As is better seen in FIG. 1, lower body 12 also defines a threaded output port 27. A pair of pressure indicators 42 and 43 are secured to and received by corresponding threaded apertures in lower body 12 and are in communication with interior chamber 45. Push rod 20 is movable in the upper direction indicated by arrow 31 and may be withdrawn downwardly in the direction indicated by arrow 32.

FIG. 3 sets forth a section view of the present invention gas valve taken along section lines 3—3 in FIG. 2. Gas valve 10 includes an upper body 11 defining an interior chamber 45. Upper body 11 further defines a generally cylindrical boss 24 which receives and supports a magnetic ball retainer 22. A threaded input port 26 is formed within upper body 11 and is in communication with interior chamber 45. A pair of pressure indicators 40 and 41 (the former seen in FIG. 2) are threadably received within and secured to upper body 11. Upper body 11 further defines an undercut groove 61 which receives an annular steel washer 62.

Gas valve 10 further includes a lower body 12 which completes interior chamber 45 and defines a downwardly extending cylindrical boss 28. Lower body 12 further defines a threaded output port 27 in communication with interior chamber 45. A pair of pressure indicators 42 and 43 (the former seen in FIG. 2) are threadably received within and secured to lower body 12. Lower body 12 also defines an annular groove 50 formed in the upper surface thereof which receives and supports a sealing O-ring 51. Lower body 12 further defines an inwardly extending lip 52 which receives and supports an annular magnetic washer 53 and a sealing O-ring 60. O-ring 60 is secured between magnetic washer 53 and steel washer 62 and is captivated by the attachment of upper body 11 to lower body 12. During this attachment, fasteners 30 provide the above-described securing attachment and O-ring 51 is compressed to provide a secure gas-tight seal between the interfacing surface of upper body 11 and lower body 12.

Downwardly extending boss 28 within lower body 12 defines a plurality of internal threads 66 as well as an annular undercut groove 80. Correspondingly, glan nut 21 defines a plurality of external threads 65 which cooperate with threads 66 of boss 28 to threadably secure glan nut 21 thereto. An O-ring 81 is captivated between glan nut 21 and boss 28 within undercut 80 to provide a gas-tight seal between glan nut 21 and boss 28. In addition, glan nut 21 defines a center passage 29 having a pair of spaced apart grooves 70 and 71. Grooves 70 and 71 receive a pair of O-rings 72 and 73 respectively. Push rod 20 defines an elongated generally cylindrical member extending through passage 29 and terminating in an enlarged head 67. Push rod 20 is slidable movable within passage 29 and sealingly engaged by O-rings 72 and 73 to preserve the gas-tight integrity of interior chamber 45.

In operation, with input port 26 coupled to a source of pressurized gas and output port 27 coupled to a typical consumer installation, under normal conditions, steel closure ball 55 is supported within the upper portion of chamber 45 by the magnetic attraction of magnetic ball retainer 22. The strength of magnetic ball retainer 22 and the spacing between ball retainer 22 and steel ball 55 determines the degree of jarring or shaking required to separate steel ball 55 from magnetic retainer 22. Under normal conditions, however, such shaking does not exist and steel ball 55 remains in the uppermost portion of interior chamber 45. Thus, under normal conditions, a direct gas-tight communication is provided between input port 26 and output port 27 via interior chamber 45. Push rod 20 is, under normal conditions, positioned in the manner shown which defines its furthest withdrawal position and in which head 67 is received within cylindrical boss 28. Under such conditions, the abovedescribed pressure indication provided by pressure indicators 40 through 43 indicates a normal open valve gas flow condition.

In the event a seismic disturbance or other severe jarring of gas valve 10 occurs with sufficient energy to shake steel ball 55 loose from magnetic ball retainer 22, steel ball 45 is released and falls downwardly to be received within the valve seat formed by annular washer 62, O-ring seal 60 and magnetic washer 63. Under such conditions, steel ball 55 occupies the position shown in dashed line representation. When so positioned, a sealing engagement between the surface of steel ball 55 and O-ring seal 60 is provided due substantially to the weight of steel ball 55. In addition, a further sealing force is provided by the magnetic attraction between annular magnetic washer 53 and steel ball 55. This magnetic attraction helps maintain a positive seal between steel ball 55 and O-ring 60 in the event of further vibration or shaking as the seismic event or other disturbance continues.

With steel ball 55 in the position shown in dashed line representation, the resulting seal against O-ring 60 closes gas valve 10 and prohibits the continued flow of pressurized gas into lower body 12 and output port 27. As a result, pressure indicators 43 and 42 (the latter seen in FIG. 2) provide an indication of the absence of gas pressure while pressure indicators 40 and 41 (the former seen in FIG. 2) continue to provide an indication of gas pressure within upper body 11. Thus, the user is able to determine immediately by examining pressure indicators 41 and 43 or pressure indicators 40 and 42 that gas valve 10 has indeed closed.

Once the seismic disturbance has past and it is desired to return gas valve 10 to its normal open condition, push rod 20 is forced upwardly bringing head 67 beneath steel ball 55 and thereafter raising it to the position shown in solid line representation in FIG. 3 at which time the magnetic attachment between steel ball 55 and ball retainer 22 is restored. Once the magnetic attachment has been restored, push rod 20 may be withdrawn downwardly and returned to the fully withdrawn position shown in FIG. 3. At this point, gas valve 10 is again opened and pressure indicators 40 through 43 again provide a positive indication of gas pressure and the open condition of gas valve 10.

FIGS. 4a and 4b set forth section views of pressure indicator 41 taken along section lines 4—4 in FIG. 3. FIG. 4a sets forth the configuration of pressure indicator 41 in the absence of gas pressure within interior chamber 45 while FIG. 4b sets forth the configuration of pressure indicator 41 in response to a positive gas pressure condition within interior chamber 45.

More specifically, and with reference to FIG. 4A, upper body 11 defines a threaded aperture 90 extending through the wall of upper body 11 into interior chamber 45. Pressure indicator 41 includes an indicator body 91 having a plurality of external threads 92 cooperating with threaded aperture 90 to receive and secure indicator body 91 in a gas-tight attachment to upper body 11. Indicator body 91 further defines a center aperture 93 having a generally spherical lens 96 secured thereto. In its preferred form, lens 96 is sealingly attached to indicator body 91 using a high strength sealing adhesive or the like. It will be apparent to those skilled in the art, however, that other forms of attachment between lens 96 and indicator body 91 may be utilized without departing from the spirit and scope of the present invention. Indicator body 91 further defines an interior cavity 94 and an encircling groove 95. Groove 95 receives a planar flexible diaphragm 97 in a sealing attachment using a high strength adhesive or other means of gastight high strength attachment. Diaphragm 97 further supports a highly visible indicator member 98. Indicator member 98 is generally cylindrical and sized to fit easily into aperture 93 of indicator body 91.

In the absence of a positive gas pressure within interior chamber 45, diaphragm 97 is relaxed and assumes the generally planar configuration shown in FIG. 4a. With diaphragm 97 so configured, indicator member 98 is withdrawn from aperture 93 of indicator body 91. Thus, examination of lens 96 by the user shows an absence of indicator member 98 from which the user may readily deduce that no positive gas pressure is present within interior chamber 45.

FIG. 4b sets forth the configuration of pressure indicator 41 which results from the introduction of a positive gas pressure within interior chamber 45. The positive gas pressure within interior chamber 45 forces diaphragm 97 outwardly in the direction indicated by arrows 100 and 101. The generally spherical flexing to the convex configuration shown for diaphragm 97 in FIG. 4b moves pressure indicator member 98 outwardly through aperture 93 and into optical communication with lens 96. Thus, under pressure conditions, the user in observing lens 96 is able to discern the presence of brightly colored indicator member 98 within aperture 93 and confirm the presence of gas pressure within interior chamber 45.

What has been shown is a seismic activated gas valve having a plurality of pressure indicators which provide direct indication to the user as to the gas pressure conditions within the valve. The magnetically retained closure ball is easily returned to the open condition using a vertically actuated push rod. A combination O-ring seal and magnetic washer form a gastight valve seat for the closure ball when the gas valve is closed which further resists rattling or shaking with continued seismic activity.

That which is claimed is:

1. A gas valve comprising:
    a valve body defining an interior chamber, an input port, and an output port;
    a valve seat interposed between said input and output ports within said interior chamber;
    a magnetic retainer supported by said valve body above said valve seat;
    a closure element magnetically supportable by said magnetic retainer within said interior chamber at a point generally above said valve seat;
    a first pressure indicator coupled to said interior chamber above said valve seat and a second pressure indicator coupled to said interior chamber below said valve seat; and means for reopening said valve.

2. A gas valve as set forth in claim 1 wherein said valve seat includes a resilient seal member having an aperture therethrough for receiving a portion of said closure element in a sealing contact.

3. A gas valve as set forth in claim 2 wherein said valve seat includes a generally annular magnetic member supported proximate said resilient seal member.

4. A gas valve as set forth in claim 3 wherein said closure element defines a generally circular horizontal cross section and wherein said resilient seal member is generally annular.

5. A gas valve as set forth in claim 4 wherein said first and second pressure indicators assume differing visual characteristics when pressure is absent than when pressure is present.

6. A gas valve as set forth in claim 5 wherein said first and second pressure indicators each include a pressure responsive diaphragm and indicator member supported thereon.

7. A gas valve as set forth in claim 6 wherein said first and second pressure indicators each include a cover plate having an aperture therein for receiving said indicator member when said diaphragm is flexed under pressure.

8. A gas valve as set forth in claim 7 further including third and fourth pressure indicators each generally identical to said first and second pressure indicators coupled to said valve body in respective diametrically opposed positions to said first and second pressure indicators respectively.

9. A gas valve as set forth in claim 4 wherein said closure element is generally spherical.

* * * * *